Patented Apr. 8, 1924.

1,489,915

UNITED STATES PATENT OFFICE.

ERICH BAUM AND MARTIN MUGDAN, OF NUREMBERG, GERMANY, ASSIGNORS TO CONSORTIUM FÜR ELEKTROCHEMISCHE INDUSTRIE G. M. B. H., OF NUREMBERG, GERMANY.

MANUFACTURE OF ACETALDEHYDE FROM ACETYLENE.

No Drawing. Application filed July 20, 1914. Serial No. 852,120.

*To all whom it may concern:*

Be it known that we, ERICH BAUM and MARTIN MUGDAN, subjects of the German Emperor, residing at Nuremberg, in the Empire of Germany, have invented certain new and useful Improvements in the Manufacture of Acetaldehyde from Acetylene (for which we have made application in Switzerland, July 14, 1914, Patent No. 71,990; Germany, July 15, 1914, Patent No. 25,173; Austria, July 16, 1914, patent not yet granted; Sweden, July 16, 1914, Patent No. 43,001; France, July 16, 1914, Patent No. 475,183; Belgium, July 17, 1914, Patent No. 269,317; England, July 17, 1914, Patent No. 16,957/1914; Italy, July 17, 1914, Patent 144,187; Hungary, July 17, 1914, no patent granted; Norway, July 23, 1913, Patent No. 25,625; Spain, August 10, 1914, Patent No. 58,940), of which the following is a specification.

The object of the present invention is a process for the technical manufacture of acetaldehyde by the action of acetylene on hot acid solutions in presence of mercury compounds in which the conditions are so chosen that the acetaldehyde is produced freely—but is displaced from the reaction vessel directly after its formation. To this end the acetylene is passed in a continuous current and in considerable excess through the reaction mixture, the sulphuric acid content of which is from about 6 to about 35%, and at a temperature below the boiling point of said acid solution, in such manner that a steady and uninterrupted current of acetylene circulates through the reaction vessel and a device for absorbing or condensing the aldehyde.

It is only by continually removing the aldehyde formed that it is possible to maintain the reaction in such manner as to allow of working continuously in a single operation without continually making periodic changes of temperature or pressure.

Beyond its importance for the continuity of the process, the steady removal at the moment of formation of the aldehyde which is produced, causes an acceleration of the reaction. In fact the partial pressure of the acetylene which reacts, which depends on the quantity and pressure of the other vapours present, is diminished in proportion to the amount to which the aldehyde content of the atmosphere increases. Hence the smaller the content of aldehyde in the reaction vessel, the more intense is the action of the acetylene.

It is the object of the present invention to attain the maximum reaction velocity under all conditions (at given values of concentration, temperature and pressure).

Finally the steady displacement at the moment of formation of the aldehyde produced, inhibits the formation of higher condensation products and especially the formation of resin to any considerable extent. In this way the yield is improved and the reaction liquid is prevented from becoming dirty so that it can now be employed for weeks at a time. At the same time the mercury separates out quantitatively in the pure liquid as a coherent regulus, which is drawn off from time to time as pure metal, which can readily be transformed again into oxide.

The transformation of the aldehyde into higher condensation products by the acid solution is accelerated by raising the temperature or concentration of said acid solution, in the same way as the primary reaction for forming acetaldehyde is also accelerated. Consequently all processes in which the acetaldehyde produced remains for some time in the reaction chamber, are limited by conditions of concentration and temperature which are not per se the most favourable for manufacture, but which nevertheless must be considered in order to prevent resin formation.

Thus the invention especially allows the employment of temperatures and concentrations of acid at which otherwise the formation of resin would be unavoidable.

The production of the acetaldehyde takes place with considerable evolution of heat (about 1000 calories per kilogram aldehyde), and this causes a difficulty in performing the reaction in practice which it was almost impossible to overcome in all previous processes. Indeed no materal for the reaction vessel was known which would permanently resist attack of the acid and the amalgamating action of the mercury in view of this extraordinary evolution of heat. This difficulty is overcome according to the present invention in an extraordinarily simple way and indeed simply by suitable adjustment of the circulating current of excess of acetylene. To this end, the applicants rely on the following phenomenon which at first appears to be a paradox, namely, that the process of preparation which at low temperatures is highly exothermic, will furnish smaller and smaller quantities of heat when the temperature is raised with corresponding adjustment of the circulating current of excess of acetylene so that finally the reaction becomes endothermic.

In preparing the aldehyde water is continually consumed partly by the reaction itself and partly by evaporation in the current of acetylene, and this water is replaced by fresh. Owing to the evaporation heat is absorbed; the addition of cold fresh water absorbs a further quantity of heat. The evaporation increases on the one hand with rising temperature and on the other hand with increase in the amount of acetylene which is circulated. Applicants have found that the circulation of acetylene and the temperature can be regulated in such manner that the heat absorbed by evaporation and by the addition of fresh water can be made smaller or greater than the heat of reaction or equal thereto.

In an isolated reaction apparatus, at a suitable value for the circulation of the current of acetylene, a thermal equilibrium is automatically produced i. e. a temperature at which neither cooling nor heating is required, since the temperature is raised by the heat of reaction until further heat is no longer evolved. Cooling is then unnecessary. Earthenware boilers or tiled boilers can be employed which are preferably insulated with special care, in order to avoid differences of temperature and the danger of breakage incident thereon.

According to the invention therefore pure acetaldehyde can be obtained in a simple manner without cooling but yet in a continuous process and with no interruptions in working. It is simply necessary to allow the acetylene to circulate through the preferably previously heated liquid, to keep the volume of the liquid constant by the addition of fresh water, to draw off from time to time the mercury lying at the bottom and to add fresh catalyst in place thereof. The acetylene required in the formation of acetaldehyde is continually drawn into the apparatus by the reduction in pressure caused by the absorption.

The surprising efficiency of the process will be perceived from the following examples.

1. Acetylene is introduced into 1.8 litres of 20% sulphuric acid at 70°–80° with vigorous stirring, and with addition of 10 grammes of mercuric oxide per hour, and at the same time by means of a small pump, an excess of acetylene of 61 litres per hour is caused to circulate. The aldehyde is removed from the circulating gas by means of a small scrubber. 54 litres of acetylene per hour are continually absorbed. After 48 hours the liquid was clear and free from condensation products i. e. it was suitable for carrying out the reaction for any further desired time while its content in aldehyde was far less than 1%. The mercury used had separated as a regulus. Cooling was unnecessary.

2. The reaction was performed under otherwise identical conditions except that excess of acetylene was not circulated; as in Example 1, half a litre of acetylene was allowed to escape from the closed apparatus behind the aldehyde absorption device, in order to wash out the traces of foreign gases contained in the acetylene and thus to avoid any retardation of the reaction which might take place thereby. Approximately 19 litres of acetylene per hour were absorbed but even after 13 hours the liquid was coloured reddish brown, smelt strongly of condensation products, and contained much resin which to a large extent held the mercury which was used. In particular this resin covered the bottom of the vessel in a coherent layer. Obviously it was impossible to continue the experiment. The aldehyde content of the liquid was about 4%.

3. Acetylene was led with stirring into an earthenware boiler containing 350 litres of 15% acid, which boiler was situated in a vat filled with hot water; mercuric oxide was regularly added and the water lost by evaporation and consumed by the reaction itself was replaced in the form of ordinary tap water. 11–13 cubic metres of acetylene were circulated per hour. The absorption of acetylene amounted to 8 to 9 cubic metres per hour. If the temperature in the water bath was maintained at about 50°–60° then the temperature in the reaction apparatus adjusted itself to about 75°. There was a temperature drop of about 15°–25° between the inner and outer wall of the earthenware vessel and heat was conducted through the earthenware wall. The process was exothermic. If however the water was heated to about 80°, then the temperature in the reaction vessel was also about 80° i. e. the same inside and out. Under these conditions, the heat of reaction was exactly balanced by evaporation and addition of water. Heat was not removed by cooling, except accidentally at places where the temperature was locally different.

We declare that what we claim is:—

1. The process of manufacturing acetaldehyde which consists in causing acetylene to continually pass in the presence of a mercury compound through a hot watery solution containing an acid, and the acetaldehyde thus formed to be carried off and introducing fresh water the quantity and rate of flow of the acetylene and fresh water being so chosen that the aldehyde is carried off as fast as formed and the heat of reaction is approximately compensated.

2. The process of manufacturing acetaldehyde which consists in causing acetylene to repeatedly pass in the presence of a mercury compound through a hot watery solution containing an acid, and the acetaldehyde thus formed to be carried off, and introducing fresh water, the quantity and rate of flow of acetylene and fresh water being so chosen that the aldehyde is carried off as fast as formed and the heat of reaction is approximately compensated.

3. The process of manufacturing acetaldehyde which consists in causing acetylene to circulate in the presence of a mercury compound through a hot watery solution containing an acid, and the acetaldehyde thus formed to be carried off, and introducing fresh water, the quantity and rate of flow of acetylene and fresh water being so chosen that the aldehyde is carried off as fast as formed and the heat of reaction is approximately compensated.

4. The process of manufacturing acetaldehyde which consists in causing acetylene to continually pass in the presence of a mercury compound through a hot watery solution containing an acid, and the acetaldehyde thus formed to be carried off, and introducing fresh water, the quantity and rate of flow of acetylene and fresh water being so chosen that the aldehyde is carried off as fast as formed, the heat of reaction is approximately compensated and the temperature of the solution is maintained at about 80 degrees C.

5. The process of manufacturing acetaldehyde which consists in causing acetylene to continually pass in the presence of a mercury compound through a hot watery solution containing between 6 and 35 per cent of an acid, and the acetaldehyde thus formed to be carried off, and introducing fresh water, the quantity and rate of flow of acetylene and fresh water being so chosen that the aldehyde is carried off as fast as formed and the heat of reaction is approximately compensated.

6. The process of manufacturing acetaldehyde which consists in causing acetylene to continually pass in the presence of a mercury compound through a hot watery solution containing between 6 and 35 per cent of sulphuric acid, and the acetaldehyde thus formed to be carried off, and introducing fresh water, the quantity and rate of flow of acetylene and fresh water being so chosen that the aldehyde is carried off as fast as formed and the heat of reaction is approximately compensated.

In testimony whereof we affix our signatures in presence of two witnesses.

Dr. ERICH BAUM.
Dr. MARTIN MUGDAN.

Witnesses:
 Martin Erhard,
 Yngvar Bognaas.